United States Patent [19]

Nakamura et al.

[11] Patent Number: 5,680,285
[45] Date of Patent: *Oct. 21, 1997

[54] MAGNETIC DISK HAVING IMPROVED SURFACE CONFIGURATION AND MAGNETIC DISK UNIT INCLUDING SAME

[75] Inventors: Takao Nakamura; Nobuya Sekiyama, both of Yokohama; Hiroshi Tani, Atsugi; Yoshiki Kato, Tokyo, all of Japan

[73] Assignee: Hitachi, Ltd., Tokyo, Japan

[*] Notice: The term of this patent shall not extend beyond the expiration date of Pat. No. 5,388,020.

[21] Appl. No.: 622,623

[22] Filed: Mar. 27, 1996

Related U.S. Application Data

[62] Division of Ser. No. 359,272, Dec. 19, 1994, Pat. No. 5,549,211, which is a division of Ser. No. 964,897, Oct. 22, 1992, Pat. No. 5,388,020.

[30] Foreign Application Priority Data

Oct. 23, 1991 [JP] Japan .................. 3-275193

[51] Int. Cl.$^6$ .................. G11B 5/82; G11B 5/66; B05D 5/12
[52] U.S. Cl. .................. 360/135; 428/694 SG
[58] Field of Search .................. 360/103, 125, 360/126, 131, 135; 428/694 TR, 694 SG

[56] References Cited

U.S. PATENT DOCUMENTS

| | | | |
|---|---|---|---|
| 4,568,599 | 2/1986 | Ono et al. | 428/694 SG |
| 4,578,729 | 3/1986 | Suzuki et al. | 428/694 TR |
| 4,670,319 | 6/1987 | Katoh et al. | 428/141 |
| 4,680,217 | 7/1987 | Kanesaki et al. | 428/141 |
| 4,762,742 | 8/1988 | Sonoda et al. | 428/694 TR |
| 4,833,001 | 5/1989 | Kijima et al. | 216/22 |
| 4,925,738 | 5/1990 | Tsuya et al. | 428/694 SG |
| 5,070,425 | 12/1991 | Inumochi | 360/135 |
| 5,124,184 | 6/1992 | Wong | 428/694 SG |
| 5,166,006 | 11/1992 | Lal et al. | 216/22 |
| 5,202,810 | 4/1993 | Nakamura et al. | 360/135 |
| 5,285,343 | 2/1994 | Tanaka et al. | 360/131 |
| 5,353,182 | 10/1994 | Nakamura et al. | 360/104 |
| 5,388,020 | 2/1995 | Nakamura et al. | 360/135 |
| 5,549,211 | 8/1996 | Nakamura et al. | 216/11 |

FOREIGN PATENT DOCUMENTS

| | | |
|---|---|---|
| 55-117741 | 9/1980 | Japan . |
| 59-84348 | 5/1984 | Japan . |
| 61-242334 | 10/1986 | Japan . |
| 62-248133 | 10/1987 | Japan . |
| 1-192014 | 8/1989 | Japan . |

*Primary Examiner*—Jefferson Evans
*Attorney, Agent, or Firm*—Antonelli, Terry, Stout & Kraus, LLP.

[57] ABSTRACT

There is disclosed a magnetic disk having a surface shape so designed as to satisfy flying and sliding characteristics in CSS and to avoid head adhesion even in a high-density recording. The surface shape of the contact surface of the magnetic disk for contact with a sliding surface of a magnetic head plays a very important role in the magnetic disk characteristics such as the head flying characteristics, the head adhesion and the CSS characteristics, and it has been found that a three-dimensional load ratio BR5 (0.5% to 10%) and a symmetric property Rsk (0.5 to 2) of a cross-section curve representing depressions and projections on the surface are essential as items of evaluation of this surface shape. For example, the surface shape of an aluminum alloy disk plated with Ni-P is processed in such a manner that the load ratio of the three-dimensional load ratio BR5 is 0.5% to 10% and that the symmetric property Rsk of the cross-sectional shape of this surface is 0.5 to 2. Then, a chromium intermediate film, a Co-Cr magnetic film, a carbon protective film and a film of lubricant are formed on the substrate. By doing so, the magnetic disk having the desired characteristics can be obtained.

6 Claims, 12 Drawing Sheets

CONTACT AREA RATIO (%)

HIGHT OF FLOATING

FIG. 19
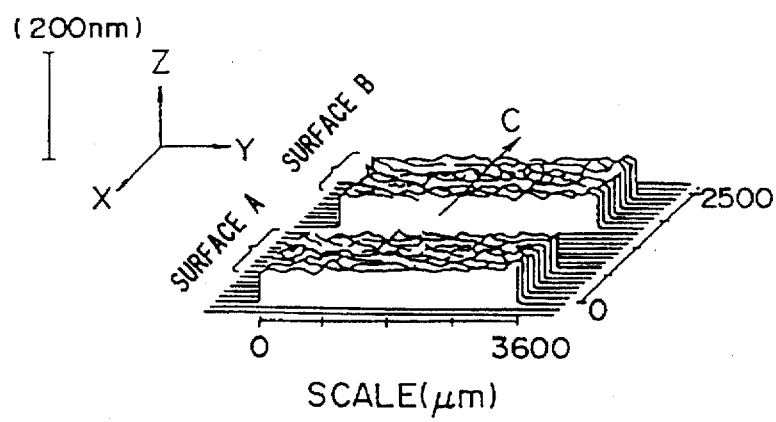
FIG. 20A
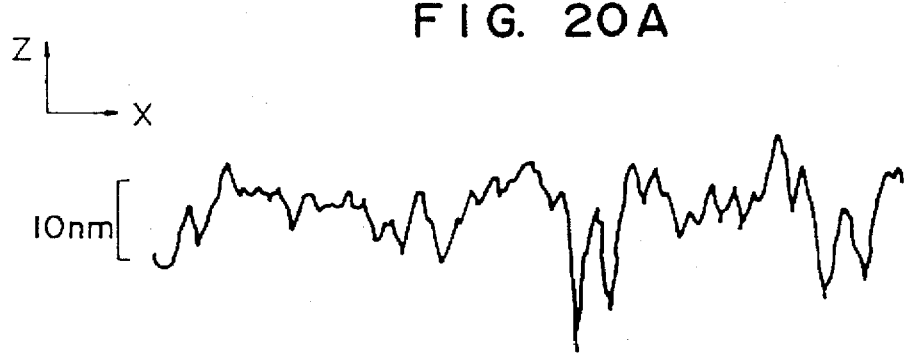
FIG. 20B
FIG. 21
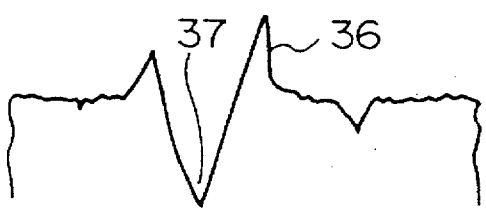

$$BR5 = \frac{a+b+c+d+e+f+g}{E} \times 100(\%)$$

MAGNETIC DISK HAVING IMPROVED SURFACE CONFIGURATION AND MAGNETIC DISK UNIT INCLUDING SAME

This is a division of application Ser. No. 08/359,272, filed Dec. 19, 1994, (now U.S. Pat. No. 5,549,211) which is a division of application Ser. No. 07/964,897, filed Oct. 22, 1992 (now U.S. Pat. No. 5,388,020).

BACKGROUND OF THE INVENTION

This invention relates generally to a magnetic disk, a method of producing the same, and a magnetic disk unit, and more particularly to a magnetic disk suitable for use as a thin film magnetic disk capable of achieving a high-density recording. More specifically, the invention relates to a magnetic disk having a surface nature suitable in terms of flying characteristics of a magnetic head, CSS characteristics and sliding durability characteristics against a head adhesion, a method of producing such a magnetic disk, and a magnetic disk unit.

Conventionally, as shown in FIG. 5, in the production of a high-density recording magnetic disk in which a thin magnetic film is formed using a thin film formation technique such as sputtering, plating or ion-plating, a film of Ni-P several tens of μm in thickness is formed by plating on a surface of an aluminum alloy substrate. Then, the opposite surfaces of the substrate are subjected to grinding or lapping and further to polishing using abrasive grains of various grain sizes, so that the surface of the substrate is finished to a surface roughness of 0.002 to 0.003 μm Ra. Then, in order to avoid a head adhesion in CSS (Contact-Start-Stop) in a magnetic disk unit, texturing is applied to the magnetic disk substrate, thereby adjusting the surface roughness to 0.004 μm to not more than 0.008 μm Ra. Then, a magnetic film and a protective film are formed on this substrate, and a lubricating film is further formed thereon. As shown in FIG. 6, the magnetic disks 1 thus produced are combined with a magnetic head 2 to provide a magnetic disk unit.

On the other hand, in order to increase a recording capacity of the magnetic disk unit, a height $H_{fly}$ of flying of the magnetic head 2 off a magnetic disk surface 1 is very small, and is required to be not more than 0.1 μm or not more than 0.2 μm. Therefore, the surface roughness of the textured surface is in the range of between not more than 0.004 μm and a value close to the polished surface roughness (0.002 to 0.003 μm Ra). Therefore, in order to reduce the flying height, it is necessary to decrease the surface roughness of the textured surface. However, in the magnetic disk of the type in which the thin film of the above layer structure is formed on the substrate surface, the head adhesion and the CSS tangential force are large, which has resulted in problems that a head support system 2' is damaged and that a disk drive motor fails to be rotated. In order to overcome these problems, there has been a demand for such a surface nature as is suitable for the surface roughness and the rugged surface (depressions and projections) of the magnetic disk surface, and therefore various shapes have heretofore been proposed.

For example, in Japanese Patent Unexamined Publication No. 55-117741, in order to improve wear resistance and lubricating properties of a magnetic (coating) film, depressions and projections are formed on the magnetic film by an abrasive tape, the depth of the depressions being about 0.1 μm, and the size of the depressions and projections being about 2 μm to about 3 μm. In Japanese Patent Unexamined Publication No. 59-84348, fine depressions and projections are formed on a substrate by etching, thereby enhancing the durability of a lubricating film and CSS characteristics. In Japanese Patent Unexamined Publication No. 61-242334, polishing traces defining fine depressions and projections on a substrate are formed regularly in the direction of the circumference of the substrate. In Japanese Patent Unexamined Publication No. 62-248133, distal ends of fine projections and depressions are flat, and are disposed in a generally common plane, that is, generally at the same height. In Japanese Patent Unexamined Publication No. 1-192014, with respect to surface shapes of a substrate and a magnetic disk, the shape of fine depressions and projections is defined by means of a specified range of the average surface roughness and a specified range of a groove depth, thereby indicating the relation of the surface shapes with flying characteristics and sliding resistance characteristics of the magnetic disk.

One method of forming such a surface shape is a texturing method as shown in FIG. 8, in which fine grooves are formed in a Ni-P plated substrate of a magnetic disk in the direction of the circumference thereof. Abrasive grains are most commonly used in this texturing method. In this processing method, the disk 11 is rotated, and contact rollers 6 are pressed against the opposite sides or faces of the disk 11 (in the direction indicated by arrow F) through abrasive tapes 3 and abrasive grains, and the abrasive tapes 3 are reciprocally moved radially of the disk 11 to form the fine grooves in the direction of the circumference of the disk. There has also been reported a method in which fine depressions and projections are formed by etching on a Ni-P plated substrate or a glass substrate for a magnetic disk, or a magnetic disk surface.

However, the above reports merely mention roughening the surface in order to avoid head adhesion and also to bring the projections on the surface into generally the same shape in order to prevent the head flying characteristics from being adversely affected; these reports do not properly indicate the surface nature of the magnetic disk quantitatively in connection with the relationship of the head flying characteristics and the CSS tangential force which are necessary for the magnetic disk. Therefore, the optimum shape for the surface nature obtained Dyany of the above methods is not clear, and the conditions of the surface formation have been merely determined in a trial-and-error manner.

Namely, as described above, it is difficult to quantitatively indicate the relation of the conventional surface roughness Ra or Rmax with the head flying characteristics and the CSS tangential force.

SUMMARY OF THE INVENTION

It is therefore an object of this invention to overcome the above problems of the prior art, and more specifically a first object of the invention is to provide an improved magnetic disk which has a desired surface shape through a method in which the effective surface nature of the magnetic disk is quantitatively evaluated, and evaluation items for various characteristics of the magnetic disk, as well as evaluation methods thereof, are established.

A second object of the invention is to provide a method of producing such a magnetic disk.

A third object of the invention is to provide a magnetic disk unit using such magnetic disks.

The inventors of the present invention have quantitatively evaluated the surface nature formed on the magnetic disk substrate by the above-mentioned processing methods, and have made an extensive study of the evaluation items for the various characteristics of the magnetic disk and the evaluation methods thereof. As a result, the findings mentioned in detail hereinafter have been obtained.

The present inventors determined that the shape of the outermost surface of the disk changed by order of one nanometer (nm) because of the sliding of the head slider against the magnetic head and that the surface of the disk was thereby made level, increasing the horizontal resistance exerted on the head and causing head crashing or head stickiness when the head was stopped during CSS (contact start-stops) operation, which led to cessation of rotation of the head. The present inventors thus found that to specify the maximum surface roughness and the height of the protrusions as the processing conditions of the texture processed surface of the disk substrate was not enough to explain the CSS characteristics and the durability of disk surface in terms of, e.g., head crashing of the magnetic disk. The present inventors also noticed that no consideration was taken of the fact that the overall properties, including the configuration of the protrusions from the average surface (which is defined as an imaginary cut face (ME) cutting a cross sectional curve of, for example, FIG. 22A into an upper portion and a lower portion both of which are equal in area) and the configuration of the pits, as well as the properties of the three-dimensional bearing curve, which will be described later, were more important than the maximum surface roughness, and that no specification was therefore presented on the irregularities formed on the surface of the substrate which was necessary to improve head crashing and the CSS characteristics.

FIG. 6 shows part of a magnetic disk unit (M) as a sectioned perspective view. The magnetic disk unit (M) includes a plurality of magnetic disks 1 which are mounted coaxially and equally spaced, and magnetic heads 2 for writing data on and reading data from the corresponding surfaces of the disks. FIG. 7 schematically illustrates the relation between the disk 1 and the head 2 (also called a head slider) in the magnetic disk unit shown in FIG. 6. The head 2 is fixed to the forward end of an arm 2', and is respectively in contact with and slides against the surface of the disk when the disk is stationary and at the initial stage of the rotation of the disk due to the elastic force of the arm 2' applied thereon. Once the rotational speed of the disk has increased, the head 2 floats up to a position separated from the disk by a submicroscopic distance under the effect of air stream to the disk 1. These states of the head are illustrated in FIGS. 13A and 13B. FIG. 13A illustrates the state in which the head is in contact with the disk, which is obtained when the disk is at a stop and when the head slides against the disk, and FIG. 13B illustrates the state in which the head floats up in the air, which is obtained when the disk is rotating at a high speed. As shown in FIG. 14, the head 2 has a slider (S) which slides against the surface of the disk at each side thereof.

The surface of the head slider (S) has a width of 0.4 mm (w) and a length of 4 mm (l). The head slider (s) is mounted with its longer side being substantially directed in the circumferential direction of the disk. An important aspect of the irregular configuration of the surface of the disk is hence the irregular configuration with respect to at least a width w of lead sliders, i.e., a width of 0.4 mm or above.

The method of measuring the cross-sectional form of the surface of the substrate subjected to the texture process will be described now. Measurement was conducted in the radial direction of the substrate over a length corresponding to the width w of the head slider (e.g., 0.4 mm) or above using a surface roughness tester TALY STEP (manufactured by Rank Talor Hobson) which employed a stylus having dimensions of 0.1 μm×2.5 μm. The cross-sectional form of the surface of the substrate is represented by a curve. An output signal from TALY STEP was A/D converted, and the obtained digital signal was processed by a computer. The analog signal was sampled at intervals of less than 40 nm.

Fine protrusions represent respective fine crests (called protrusions in this invention) as shown in FIG. 15 which protrusions protrude from a central line C of the above-described cross-sectional curve obtained by conducting measurement in the radial direction of the substrate on which texture is formed in the approximately circumferential direction thereof or in a helical fashion. The height Rp of the fine protrusion represents the distance between the central line and the highest crest among the crests located within a unit length L measured in the radial direction of the substrate.

The method of three-dimensionally measuring the irregularities on the texture processed surface will be described below with reference to FIGS. 16A and 16B. FIG. 16A illustrates the results of the three-dimensional surface measurement G by means of Scanning Tunneling Microscope (STM). The three-dimensional surface is cut along an equally spaced plane H (whose depth from the outermost surface is Δhi) which is parallel to the average surface. The area ratio, which is obtained by dividing the area of the three-dimensional form at each section by the overall area thereof at a referential surface E which is located deeper than the irregular processed layer, is plotted with respect to each section in the graph shown in FIG. 30B. In other words, the graph shown in FIG. 30B is a three-dimensional expressed bearing curve.

This three-dimensional bearing curve is similar to contents in the Abbott-firestone (or bearing ratio) curve obtained from the two-dimensional cross-sectional curve and is the three-dimensional form thereof. The Abbott-firestone curve is employed to estimate the sliding characteristics of, for example, a bearing. The present inventors observed and measured the contact of the head with the disk in terms of the state of the head sliding surface, the state of the disk surface, and motion of the head and disk during the CSS operation, and found that the three-dimensional bearing curve obtained by means of the STM is very effective as a method of estimating the surface of the disk with a high degree of accuracy in terms of the sliding characteristics thereof.

More specifically, as shown in FIGS. 16A and 16B, in the bearing curve, the three-dimensional configuration G of the surface is cut along a plane H which is equally spaced from the top of the three-dimensional configuration, and the area ratio (percentage) obtained by dividing the total area of the three-dimensional configuration at each section by the overall area of a referential surface E is plotted for each section. At the top portion of the surface configuration, the area of the surface configuration at the section is small, and the area ratio is thus small. In other words, if the sliding member is located on such a surface, it is supported only by the top portion of the surface configuration at the initial stage of the sliding. Thus, the pressure receiving area is small, and the pressure received by the unit pressure receiving area is large. In consequence, the top portion of the surface configuration easily wears or deforms by the friction caused by the sliding of the sliding member. In contrast, at the surface where the area ratio of the top portion of the surface configuration is large, i.e., at the surface configuration whose gradient of the bearing curve is small in the range where the area ratio is small in the three-dimensional bearing curve, the pressure receiving area is large in the initial stage of the sliding, and the pressure received by the individual fine protrusion to support the sliding member is thus small, providing improved sliding-resistance characteristics. Thus, the three-dimensional bearing curve is used to estimate the ability with which the surface against which the sliding member slides can receive loads.

The principle of another method of three-dimensionally measuring the texture processed surface will be described with reference to FIG. 17. This method employs a scanning electron microscope (SEM). The intensity of the signals a and b at an incident angle θ (gradient of a sample) of an electron probe are respectively detected by two secondary electron detectors A and B, and θ is obtained from the following general formula if the signal intensities at the incident angle of 0 (which means that the electrons are incident onto a flat plane) are an and bn.

$$\tan \theta = k \{(a^2-b^2)/(an+bn)^2\} \text{(where k is a constant)}$$

The thus-obtained gradients of the sample are integrated to obtain the surface configuration in the direction of X axis. An electron rays surface configuration analyzing device, manufactured by ELIONIX, may be employed as the measuring device.

The three-dimensional surface configuration can be measured by scanning the sample in the direction of the Y axis.

The three-dimensional bearing ratio can also be estimated by employing the principle of optical interference. In this method, the surface configuration of the substrate of a magnetic disk is measured when no load is applied thereto and when a load is applied thereto using a transparent glass head 31 mounted on a load applying arm 32 through a plate spring 33 such that it can apply a load to the substrate, as shown in FIG. 18, by means of the piezo interferometer (see page from 526 to 533 in "An analyzing device for Fizeau interferometer" 27.9 (1989) by Hikari Gijitsu Kontakuto), and the area of the substrate of the magnetic disk with which the substrate is in contact with the head when loads are applied is operated and indicated in the manner shown in FIG. 19. In that case, the overall measurement range is 5.5×5.5 mm, and the resolution on a horizontal plane is 10.9 μm. FIG. 20A is a graphic representation of changes in the surface configuration which are obtained by measuring the surface A in the direction indicated by the arrow C of FIG. 57 when no load is applied thereto, and FIG. 20B is a graphic representation of changes in the surface configuration obtained by the same measurement when loads are applied.

This method is capable of measuring changes in the vertical direction in the area corresponding to the dimension of the magnetic head (e.g., 3×4 mm), the real area of contact between the head and the disk obtained in a state when the head load is applied, the state in which the contact area increases as the head load increases, and changes in the contact state between the head and the disk which are obtained in the process in which the surface of the disk changes as the start-stop-cycles increases.

The present invention which is devised on the basis of the above-described knowledges will be described more concretely below.

The substrate of the magnetic disk is made of an aluminum alloy, anodic aluminum oxide, an aluminum alloy plated with Ni-P, glass or a plastic. In order to improve the characteristics, it is required that the surface of the substrate have a large number of uniform micro grooves and fine protrusions.

These micro grooves and fine protrusions are formed on the surface of the substrate by means of a polishing tool such as a diamond bite or fine abrasive grains, and the fine protrusions are formed at the shoulders of the micro grooves as a consequence of formation of the micro grooves as the rising portions 36 shown in FIG. 21, as stated above. The height of the fine protrusion is determined by the depth or size of the pit 37, and the number of micro projections is determined by the processing conditions including the density of the fine abrasive grains or the tool feeding.

The surface character of the magnetic disk must satisfy various types of characteristics of the magnetic disk, including the electrical characteristics, the CSS characteristics and the head-stickiness characteristics, without causing head crashing. The gap between the floating head and the disk is reduced in order to achieve high-density magnetic disks. So, it is required that the surface of the disk is made high-smooth to avoid collision of the head against the disk. From the viewpoint of reduction in the head access time, so-called contact-start-stop (hereinafter referred to as a CSS) operation is conducted on the head 2 and the disk 1, in which the head 2 is in contact with the disk 1 when it is at a stop and in which the head floats up while the disk is rotating. In consequence, in a case where the surface of the disk has a smooth surface, i.e., the surface has a very small surface roughness, head adhesion occurs while the head is at a stop due to the lubricant coated on the surface of the disk or the water contents in the air, damaging the gimbal or the arm which supports the head or causing cessation of rotation of the head.

It has been found through experiments made by the inventors of the present invention that the relationship shown in FIG. 9 exists between the surface nature of the magnetic disk, formed by the processing method shown in FIG. 8, and the head flying characteristics, as well as the CSS tangential force. In explaining the CSS tangential force, at the time of the CSS of the disk device, the head begins to slide from the contact state in which the head is in contact with the disk surface, during which sliding there occurs a sliding-resisting force acting on the head in the tangential direction of the disk rotation. This sliding-resisting force is called "CSS tangential force". With respect to the evaluation items for this surface nature, it is difficult to sufficiently evaluate it by means of the surface roughness and the height of the fine projections which have heretofore been used, and the phenomenon of sliding between the head and the disk in CSS has been observed and measured, and as a result it has been found that the correlation of the surface nature with the above two characteristics is well represented by a symmetric property Rsk of a cross-section curve and a load ratio obtained from a load curve of the surface shape.

The present invention has been made based on these findings, and in order to achieve the above objects, the sliding surfaces of the magnetic head and the magnetic disk have been actually observed and measured, and the optimum sliding surface has been formed. In the commonly-used texturing method of FIG. 8 utilizing fine abrasive grains, with respect to the surface shape of the disk, the fine grooves, defining the depressions and projections several tens of nm in height, are formed at a sub-micron pitch on the substrate in the circumferential direction thereof, as shown in FIG. 10. FIG. 11 shows a surface configuration formed by a diamond tool having a distal end so shaped as to have a fine radius of curvature. FIG. 12 shows one example of a surface configuration of a magnetic disk formed by etching.

With respect to a method of evaluating these surface shapes, the cross-sectional shape in a direction perpendicular to the texturing direction is measured by a surface roughness tester, and the surface roughness (the centerline average roughness, the maximum roughness, the fine projections, the 10-point average roughness, and so on) and the surface undulations are obtained from this cross-sectional curve.

There is another method in which a magnetic head having been previously calibrated in head flying characteristics (the relationship between the rotational speed of the magnetic disk and the flying amount of the head) is caused to fly over a disk subjected to texturing, and the height of flying at which projections on the disk are contacted with the head is measured, thereby evaluating the smoothness of the disk.

However, it is difficult to sufficiently evaluate what type of disk surface shape is desired for the CSS characteristics (by which the head slides over the disk surface) and the head flying characteristics.

Therefore, the inventors of the present invention have observed this cross-sectional shape and the cross-section with respect to textured disk surfaces having various shapes, and examined the sliding conditions. As a result, it has been found that there are two conditions in order to obtain the desired surface shape. As shown by the relationship between the head tangential force and the contact area ratio in FIG. 4, one condition is that the ratio of the area of the disk face portion contacting with the head is 0.5 to 10% of the head slider area.

This head contact area ratio BR5 shown in FIG. 24B has been found by measuring surface shape of the disk sliding surface in a three-dimensional manner, using a surface roughness tester and a field emission-type scanning electronic microscope or a STM (Scanning Tunnel Microscope) and by measuring the amount of change of the disk surface caused by the sliding of the disk with the head. Namely, from the three-dimensional load curve measuring the surface shape in a three-dimensional manner, the change of the load curve before and after the sliding was examined, and the load ratio (here referred to as "load ratio BR5") of the cut surface at a depth of 5 nm from the top of the disk surface before the sliding, that is, the contact area ratio BR5 at which the head stably slides, is 0.5 to 10%, and it has been found that this is the desired surface shape before the sliding.

Namely, as shown in FIG. 4, if the contact area ratio BR5 is less than 0.5%, the contact area on the disk surface supporting the head is small, and the contact surface pressure is large when the magnetic head subjected to a head load (for example, 100 mN) slides over the disk surface, and as a result the lubricating effect by the lubricant is decreased, and the wear at the contact point of the disk is increased, and the protective film is susceptible to damage, and the head tangential force is increased.

If the contact area ratio BR5 is more than 10%, the area of contact with the head slider surface is large, the head adhesion is liable to occur under the influence of the lubricant and the moisture of the atmosphere, and the head tangential force is increased. Therefore, in view of the head sliding characteristics, and particularly in order to restrain the increase of the head tangential force with respect to the frequency of the CSS, the area ratio BR5 representing the ratio of the area of contact with the head slider surface should preferably be in the range of 0.5% to 10% as indicated by a region below a line A, and should more preferably be in the range of 0.6% to 7% as indicated by a region below a line B in view of a greater degree of safety against a head crush.

It has also been found, as the second condition for obtaining the desired surface shape of the magnetic disk, that the symmetric property Rsk of the cross-section curve of the textured surface should importantly be within a specific range (0.5 to 2.0). This second condition will now be described.

From the viewpoint of the head sliding characteristics of the magnetic disk, in order to quantitatively represent the various cross-section curves measured by a surface roughness tester and shown in FIGS. 10 to 12, a new evaluation method different from the conventional surface roughness evaluation method is used, and in this method, as shown in the following formula (1), the symmetric property Rsk of the cross-section curve capable of representing the cross-section curve as a function Y(i) is adopted.

$$Rsk = \frac{1}{n \cdot Rq^3} \sum_{i=1}^{n} Y(i)^3, Rq = \left[ \frac{1}{n} \sum_{i=1}^{n} Y(i)^2 \right]^{1/2} \quad (1)$$

In the surface processing using abrasive grains heretofore commonly used for texturing, grooves are mainly formed, and from the centerline, depressions represent the main component of the surface shape, and Rsk of this surface shape is negative. In a surface formed by etching or an energy beam, projections constitute the main component of the surface shape, and Rsk of this surface shape is positive. When Rsk is zero, the depression component and the projection component are equal to each other, and the cross-section curve is symmetrical with respect to the centerline. The relation between Rsk representing this symmetry and the load ratio will be described in detail later.

As described above, in order to indicate the various characteristics such as the CSS tangential force of the magnetic disk, the sliding characteristics with respect to the head adhesion, and the flying characteristics of the magnetic disk, the surface nature of the magnetic disk can be evaluated in terms of both of the load ratio (the first condition) the three-dimensional load curve and Rsk (the second condition) representing the symmetric property. In order to obtain the desired surface shape of the magnetic disk, it is necessary to satisfy the two conditions within the respective specified ranges at the same time, and by doing so, the objects of the present invention are achieved.

Specific means for achieving the objects of the invention will now be described.

The first object of the present invention has been achieved by a magnetic disk wherein when a surface shape of a contact surface of the magnetic disk for contact with a sliding surface of a magnetic head is evaluated and represented in terms of a load ratio BR5 of a three-dimensional load curve and a symmetric property Rsk of a cross-sectional shape, the load ratio of the surface shape is 0.5% to 10% (and more preferably 0.6 to 7%), and the symmetric property Rsk of the surface shape is 0.5 to 2.0.

The above object has also been achieved by a magnetic disk comprising a non-magnetic substrate, and a thin film formed on a surface of the substrate, the film including a magnetic film and a protective film; wherein when a surface shape of at least one of the substrate and the thin film is evaluated and represented in terms of a load ratio BR5 of a three-dimensional load curve and a symmetric property Rsk of a cross-sectional shape, the load ratio of the surface shape is 0.5% to 10%, and the symmetric property Rsk of the surface shape is 0.5 to 2.0. Such a desired surface shape of the disk may be formed on the surface of the non-magnetic substrate, or the non-magnetic substrate may be formed into a mirror surface in which case such a desired surface shape is formed on the magnetic film or the protective film formed on the substrate. The reason is that each of the magnetic film and the protective film formed on the substrate is a thin film, so that the surface shape of the substrate appears in an unchanged manner on the surface of the disk.

The second object of the invention has been achieved by a method of producing a magnetic disk comprising a surface processing step of forming fine depressions and projections in a surface of a non-magnetic substrate or a surface of at least one of a magnetic film and a protective film which are formed on the substrate, wherein the surface processing step is carried out in such a manner that when a surface shape of the substrate or a surface shape of the one film is evaluated and represented in terms of a load ratio BR5 of a three-dimensional load curve and a symmetric property Rsk of a cross-sectional shape, the load ratio of the surface shape is 0.5% to 10%, and the symmetric property Rsk of the surface shape is 0.5 to 2.0.

Examples of the above surface processing step include an etching step using lithography, a processing step using an energy beam such as a laser beam or an ion beam, a step of forming fine grooves in a circumferential direction or in a random direction using a diamond tool having a distal end whose radius of curvature is fine, and a plastic processing step depending on transfer.

The third object of the invention has been achieved by a magnetic disk unit comprises a plurality of the above-mentioned magnetic disks, the magnetic disks being mounted at predetermined intervals on a common rotation shaft, head sliders resiliently contacted respectively with at least one surface of the magnetic disks with a predetermined urging force when the disk is in a stationary condition and in an initial rotating condition, each of the head sliders having a magnetic head mounted thereon, the head slider flying over its mating magnetic disk when the magnetic disk rotates at high speed, and there being provided a head drive device of a CSS drive system for driving the head slider radially of the disk so as to read information.

The condition of change of a disk sliding surface by a magnetic head was measured and observed by the above-mentioned measuring means such as a surface roughness tester, a scanning electronic microscope FE-SEM and a tunnel microscope STM. As a result, it has been found that projections on the disk sliding surface are gradually worn, that the amount of change by CSS was 5 nm to 10 nm, and that this change amount is related to the ratio of the contact area of the disk sliding surface relative to the head slider surface. Therefore, in order to evaluate the contact area ratio, a three-dimensional load curve which evaluates the actual head sliding phenomenon most satisfactorily was obtained utilizing a load ratio obtained from a two-dimensional Abbot load curve proposed in the field of bearings etc., and the amount of wear of the disk surface in CSS was obtained experimentally, and the load ratio (here, this load ratio is referred to as "BR5") at a depth of 5 nm in a cut surface was obtained from this load curve.

This load ratio BR5 is used as the first evaluation item, and the symmetric property Rsk of the cross-section curve for evaluating the nature of the textured configuration of the disk surface is used as the second evaluation item, and by doing so, the nature of the disk surface can be represented well.

The results of the experiments which have been made by the inventors of the present invention indicate that in accordance with the above evaluation items, the best surface nature for the flying characteristics of the magnetic disk and the sliding characteristics in CSS and head adhesion was obtained when the load ratio is in the range of 0.5% to 10% (more preferably, 0.6% to 7%), and Rsk is in the range of 0.5 to 2.0.

Examples of methods of forming such disk surface include a method of forming grooves in a magnetic disk substrate (e.g. a non-magnetic substrate such as a Ni-P plated substrate) using a fine tool (e.g. a diamond tool having a fine distal end shape), a processing method utilizing the radiation of a high-energy beam such as a laser beam and an ion beam, and a method of forming a fine pattern of depressions and projections by a lithography utilizing dry or wet etching.

In the above description, although the disk surface on which the fine depressions and projections are to be formed is that of the Ni-P plated substrate, it may be an aluminum alloy substrate or a non-magnetic substrate such as a glass substrate, and the thin films such as an intermediate film, a magnetic medium, a protective film and a lubricating film, can be formed on the surface of such a substrate in a similar manner as described above.

BRIEF DESCRIPTION OF THE DRAWINGS

FIG. 19 shows an operation output obtained when the head of FIG. 18 is lightly brought into contact with the magnetic disk; and FIGS. 20A and 20B respectively show the sectional forms obtained in the direction indicated by C in FIG. 57 when no load is applied and when a head is pressed.

FIG. 21 illustrates the sectional form of a micro groove; and

DESCRIPTION OF THE PREFERRED EMBODIMENT

The preferred embodiment of the present invention will now be described with reference to the drawings.

EXAMPLE 1

Figure 2:
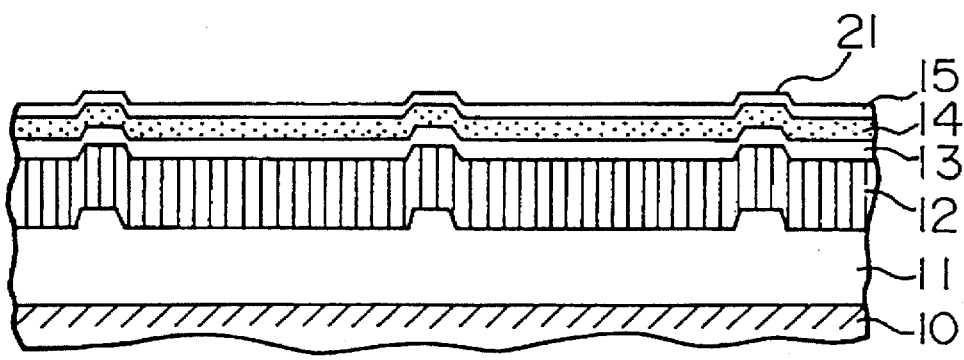
FIG. 2 is a cross-sectional view of the magnetic disk.

FIG. 2 shows one example of a cross-sectional structure of a magnetic disk according to the present invention. As illustrated, a plating film 11 of Ni-P is formed on a substrate 10 comprising an aluminum alloy disk, and a chromium intermediate film 12, a Co-Cr magnetic film 13 and a carbon protective film 14 are sequentially formed on the plating film 11 by sputtering, and then a lubricant 15 is coated, thereby providing a multi-layer structure.

Figure 1:
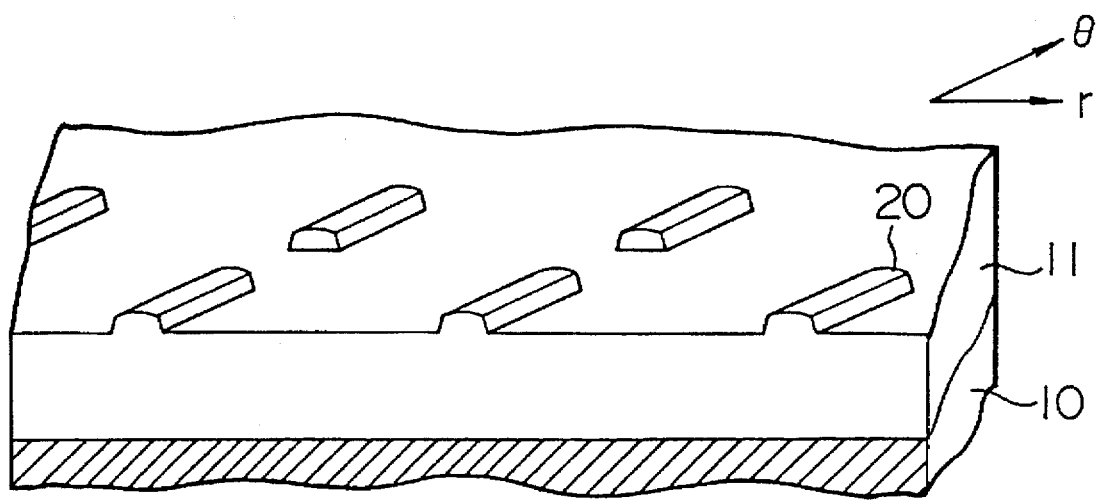
FIG. 1 is a fragmentary, perspective view of one preferred embodiment of the present invention, showing a surface shape of a magnetic disk.

(a) The surface of the magnetic disk substrate 10 plated with Ni-P (whose thickness is 10 μm) is finished by double-side polishing into a mirror surface having a surface roughness of not more than 0.002 μm, and a mask of an arbitrary pattern is formed on the Ni-P plated substrate, and then is etched in a dry manner, thereby providing the substrate having the surface shape shown in FIG. 1. The formation of this surface shape will now be described in more detail.

In order to form the surface having fine projections 20 shown in FIG. 1, a resist film pattern of polyimide or polytetrafluoroethylene is first formed by lithography on the Ni-P plated substrate finished into the mirror surface, and using this as a mask, those portions except for the resist film are removed a depth of about 10 nm to about 40 nm by etching of a dry process such as an oxygen plasma asher, and then the resist film is washed away, thereby providing the substrate surface shown in FIG. 1.

For example, the projections on this substrate surface is long (for example, 200 to 300 μm long) in the direction (indicated by θ in FIG. 1) of the circumference of the substrate, and is short (for example, 2 to 5 μm long) in the radial direction (indicated by r in FIG. 1). These fine projections 20 are distributed over the entire surface of the substrate. By changing the mask pattern shape and the etching condition, the fine projections 20 may have a desired size, and also the projections 20 distributed over the surface in a desired pattern can have a shape other than the rectangular shape, such as a square shape, a circular shape and other non-circular shape. Namely, there can be obtained the Ni-P plated substrate surface in which the load ratio BR5, obtained from a three-dimensional load curve of the magnetic disk surface, and the symmetric property Rsk of the cross-section curve of the etched substrate are arbitrarily changed.

A chromium intermediate film 12 having a thickness of 50 to 400 nm was formed by sputtering on this substrate surface, and further a Co-Cr magnetic film 13 (30 to 60 nm in thickness), a carbon protective film 14 (10 to 50 nm in thickness) and a fluorine (perfluoro-polyether is preferable) lubricating film 15 (several nm to several tens of nm in thickness) were formed by dipping it in a bath containing molten lubricant to thereby provide a magnetic disk. The surface shape of this magnetic disk was almost the same as the surface shape of the Ni-P plated substrate since the thin films on the substrate were formed by sputtering, and were very thin. Namely, the fine projections 20 formed on the surface of the Ni-P plated substrate exist on the disk surface as fine projections 21 of almost the same size as that of the projection 20.

(b) Similarly, resist films of various patterns are formed on a surface of a Ni-P plated substrate, and the surface except for the resist is removed a depth of about 20 nm to about 50 nm by wet etching (chemical etching), thereby forming substrate surfaces of various shapes depending on the resist pattern. In the manner as described above, a chromium intermediate film 12, a Co-Cr magnetic film 13, a carbon protective film 14 and a fluorine lubricating film 15 are sequentially formed to provide a magnetic disk.

Figure 11:
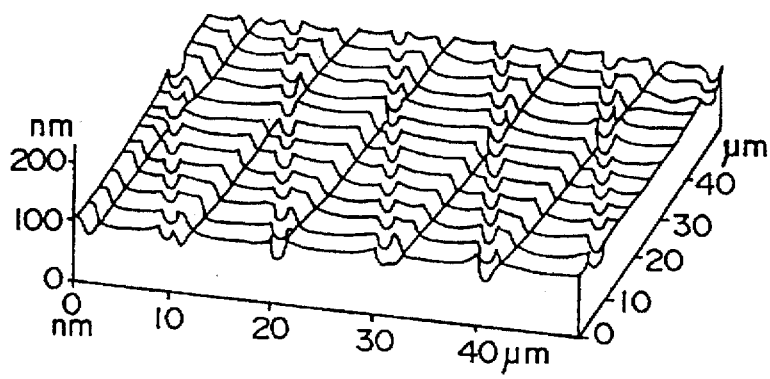
FIG. 11 is a view showing the shape of a textured surface formed by a diamond tool.
Figure 12A:
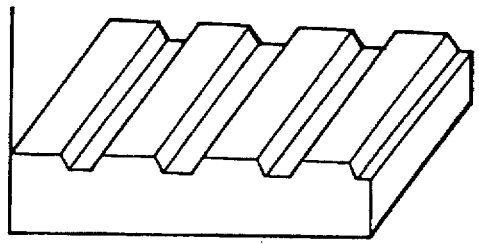
FIGS. 12A and 12B are views each showing the shape of a disk surface formed by etching.
Figure 12B:
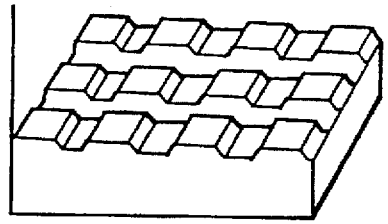
Figure 13A:
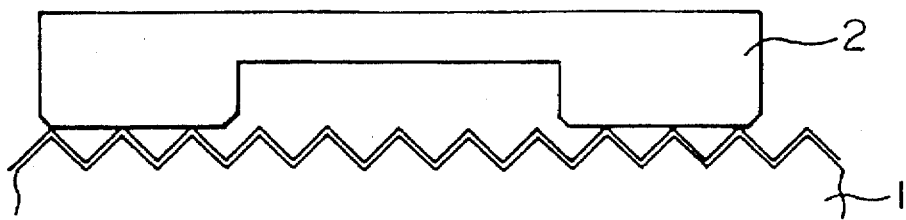
FIGS. 13A and 13B respectively show the relation in contact start-stop between the head and the surface of the disk obtained when the disk is at a stop and when the disk is rotating.
Figure 13B:
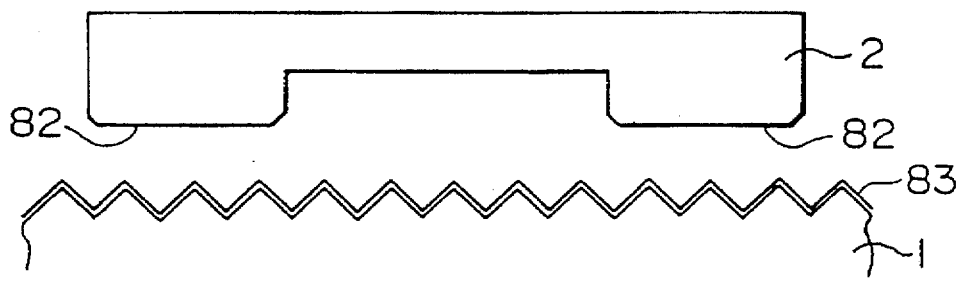
Figure 14:
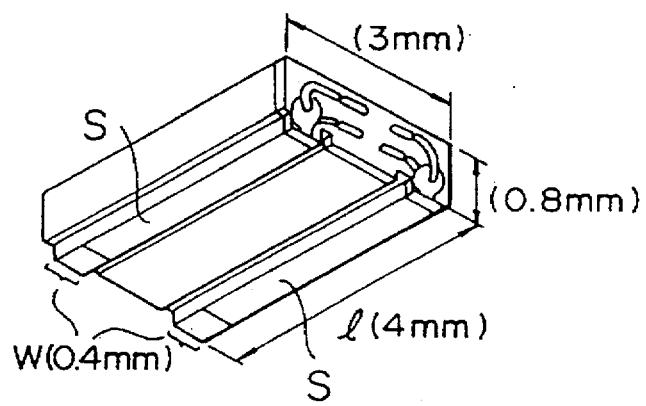
FIG. 14 is a perspective view of a head slider, showing the form of a magnetic head.
Figure 15:
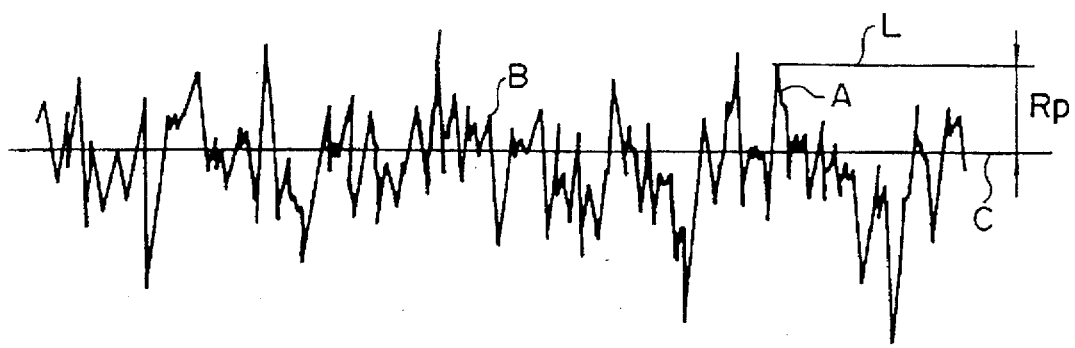
FIG. 15 shows fine protrusions in the sectional form of the texture processed surface.
Figure 16A:
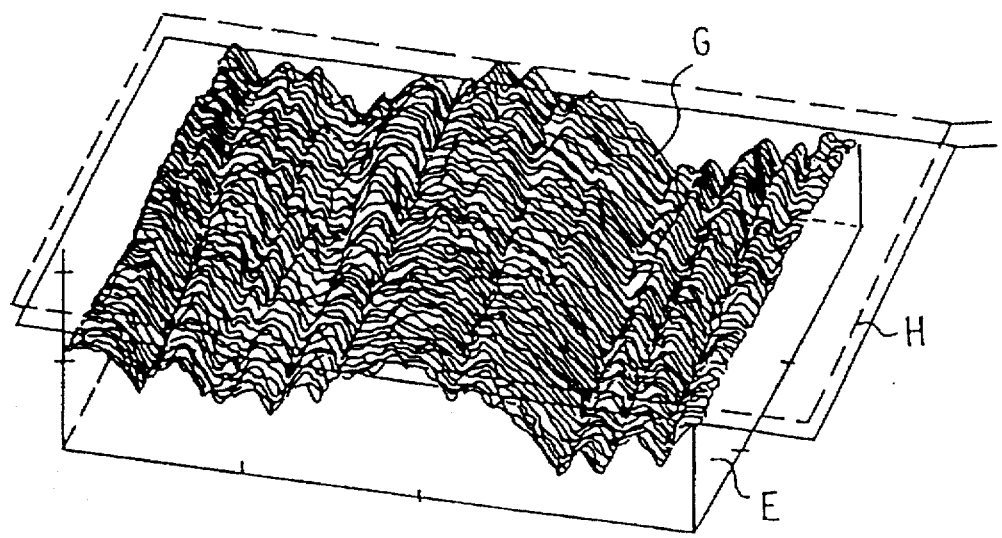
FIGS. 16A to 16B illustrate the configuration of the texture processed surface according to the present invention using the three-dimensional bearing curves.
Figure 16B:
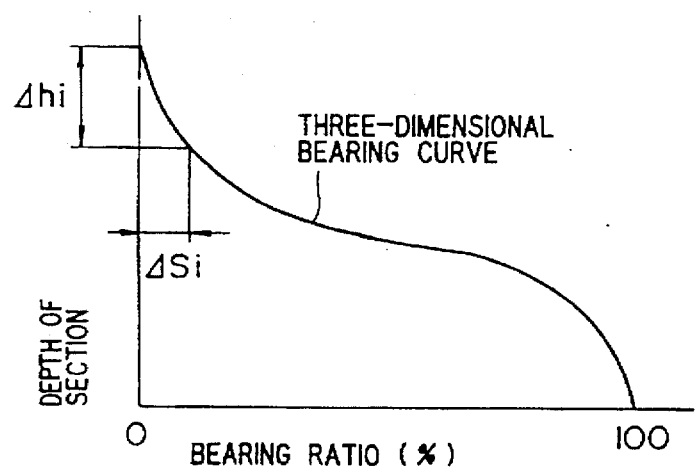
Figure 17:
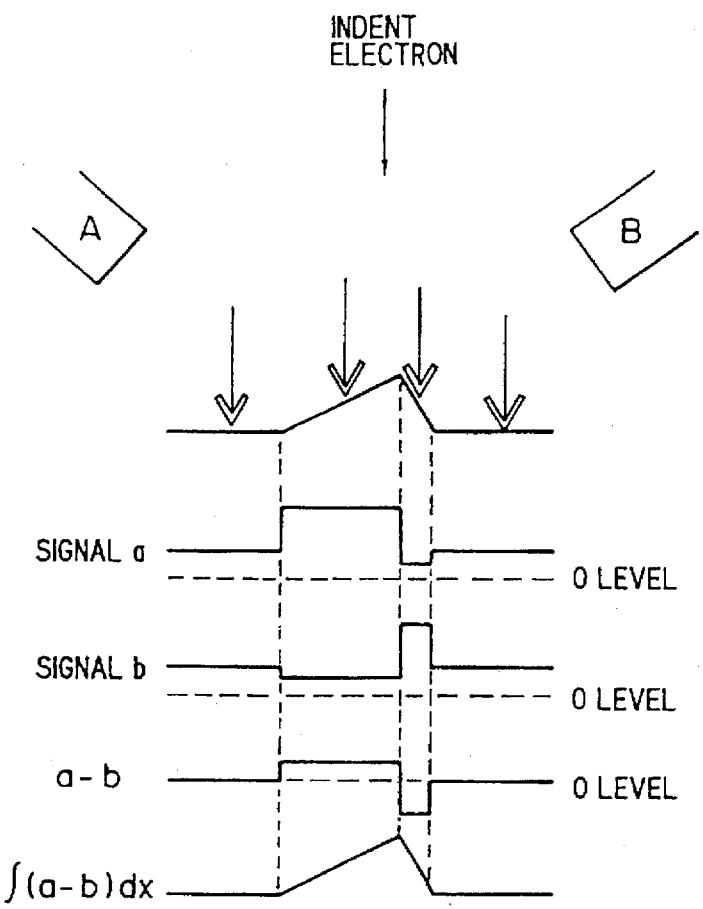
FIG. 17 illustrates the principle of the method of three-dimensionally measuring a texture processed surface by means of the SEM.
Figure 18:
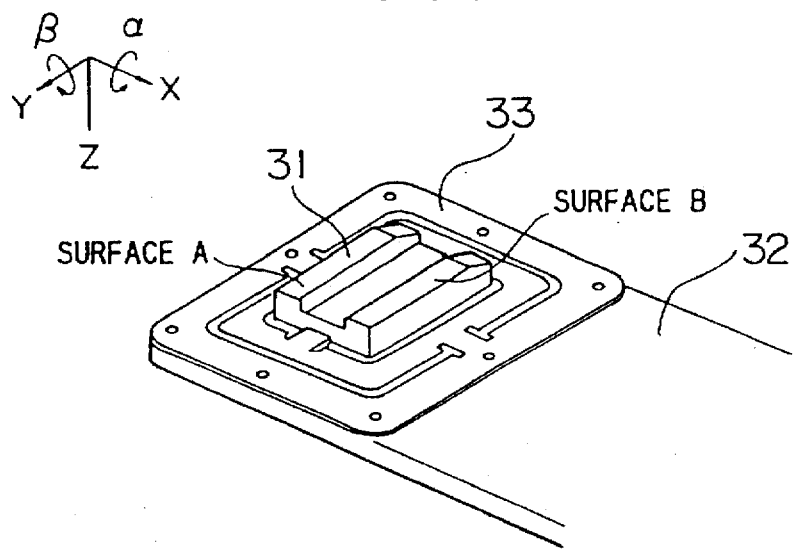
FIG. 18 is a perspective view of the contact side of a glass head employed in a Fizeau interferometer.
Figure 22A:
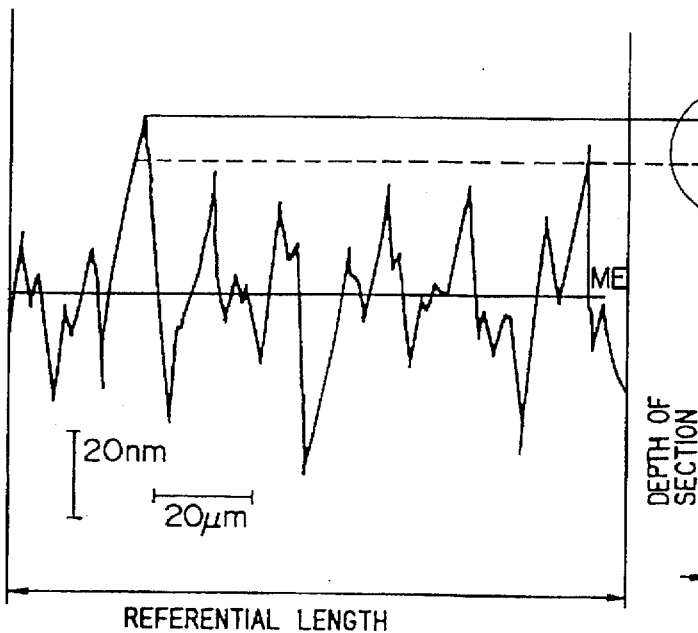
FIGS. 22A, 22B, 23A to 24B show the relation between the cross-sectional form of the texture processed surface and the three-dimensional bearing curve thereof.
Figure 22B:
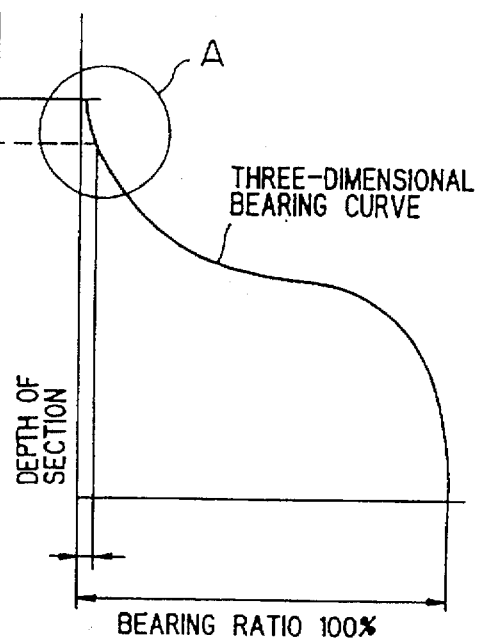
Figure 23A:
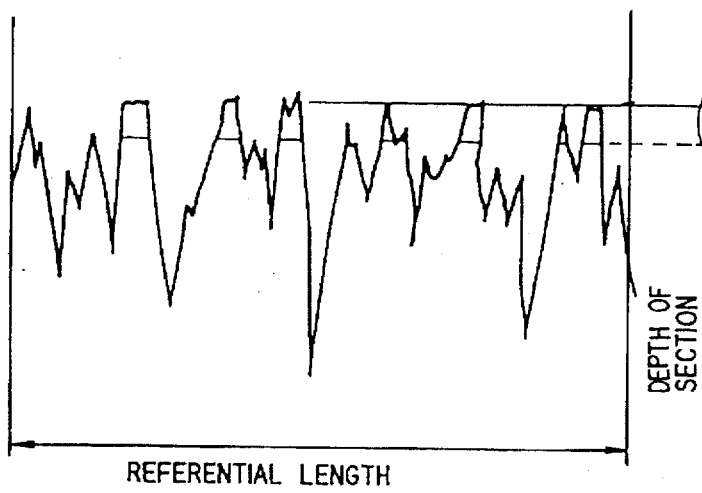
Figure 23B:
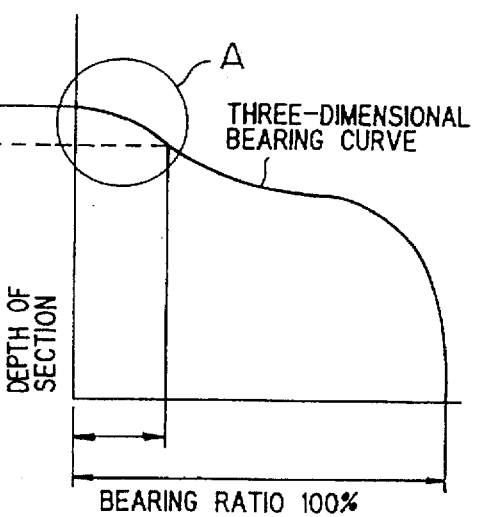
Figure 24B:
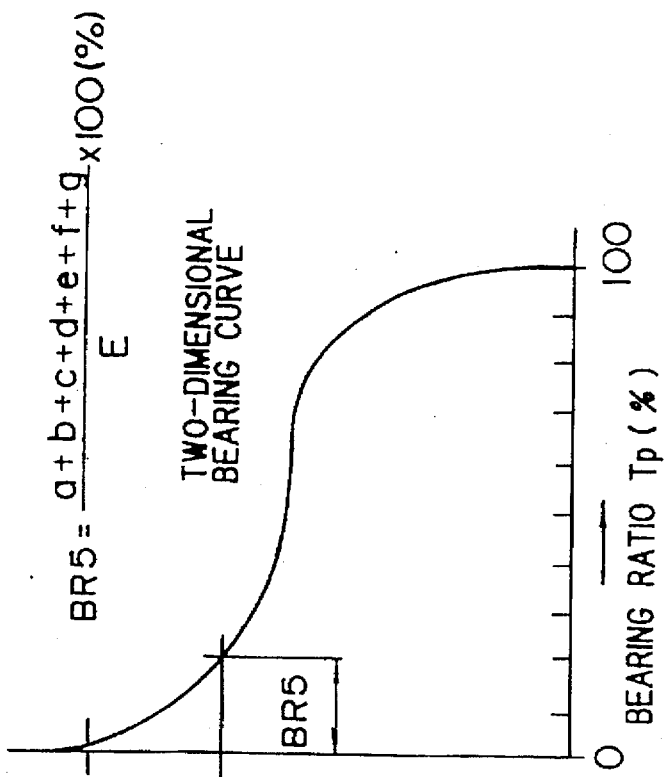
Figure 24A:
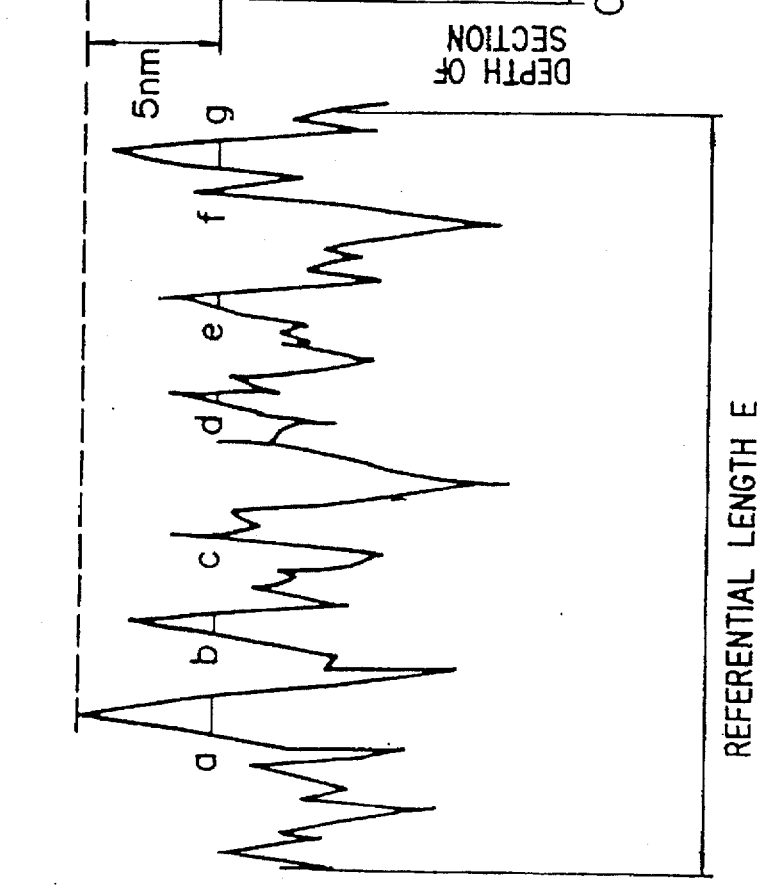

(c) Instead of the above etching techniques, using a diamond tool having a fine distal end so shaped that the radius of curvature of a blade tip is 8 μm, a Ni-P plate substrate having a cross-sectional shape defined by fine depressions and projections is formed as shown in FIG. 11, and a magnetic disk is formed as described in the above Examples (a) and (b). The cross-sectional shape of the substrate surface can be changed in various ways by changing the pitch feed of the diamond tool, the machining pressure, and the shape of the distal end of the tool.

Figure 3:
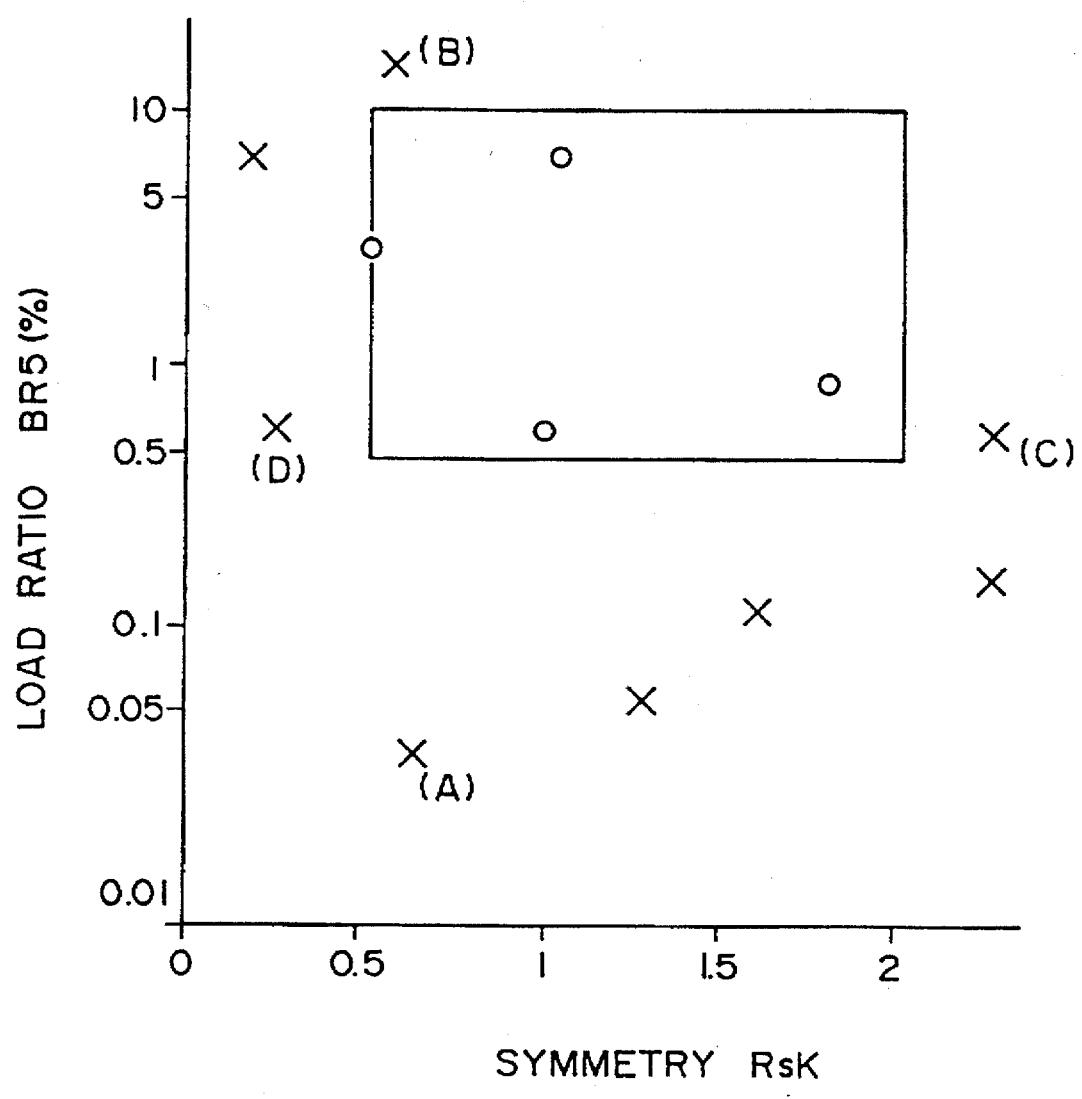
FIG. 3 is a characteristic diagram showing the relation of a load ratio BR5 and a symmetric property Rsk of the magnetic disk surface with characteristics of the magnetic disk.
Figure 4:
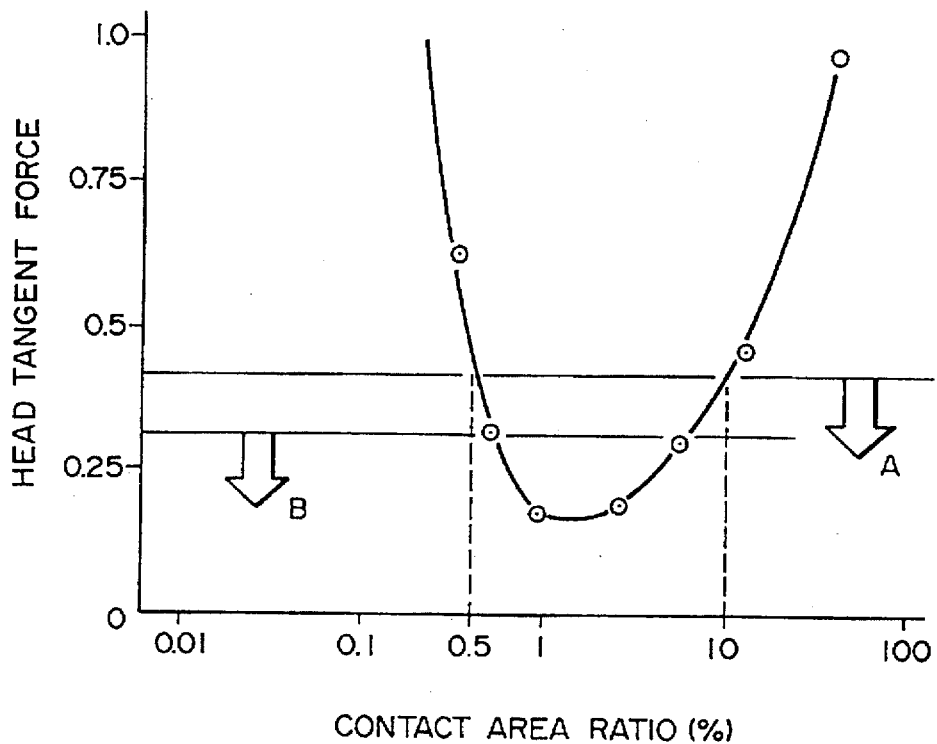
FIG. 4 is a characteristic diagram showing the relation between a head tangential force and a contact area ratio.
Figure 5:
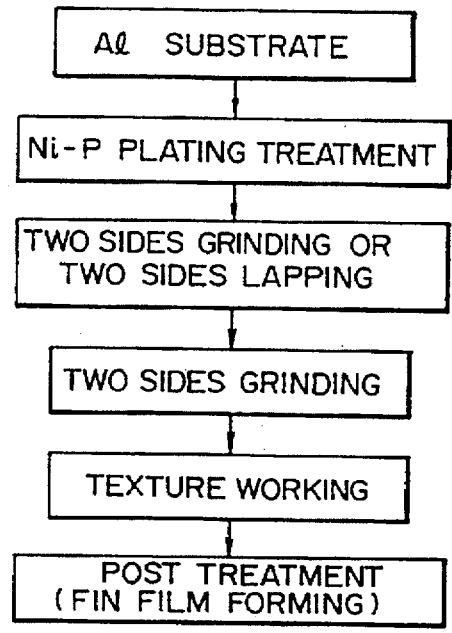
FIG. 5 is an illustration showing the process of the production of a magnetic disk substrate.

As described above, the intermediate film, the magnetic film, the protective film and the lubricating film were formed on the surfaces of the substrates formed by the various processing methods, and the various characteristics (the flying characteristics and the sliding characteristics in CSS and the head adhesion) required for the magnetic disk were examined. Results thereof are shown in FIG. 3. Namely, the nature of the magnetic disk surfaces formed by the above processing methods was evaluated by the load ratio BR5, obtained from the three-dimensional load curve, and the symmetric property Rsk obtained from the cross-sectional shape, and the relation with the various characteristics of the magnetic disks was examined, and the measurement results of the load ratio BR5 and the symmetric property Rsk satisfying the various characteristics are shown in FIG. 3.

These results indicate that the surface shape of the magnetic disk which satisfies the characteristics required for the magnetic disk is obtained when the load ratio BR5 is in the range of 0.5% to 10% (more preferably, 0.6% to 7%), and the symmetric property Rsk is in the range of 0.5 to 2, as is clear from the following experiments.

Namely, if, the load ratio BR5 obtained from the three-dimensional load curve representing the surface shape of the magnetic disk is less than 0.5% (as indicated by A in FIG. 3), the contact point of the disk surface supporting the magnetic head applying a head load (for example, 100 mN) is small, and the surface pressure of the projection in contact with the head in CSS is very large, and the lubricating effect by the lubricant is decreased. As a result, the projection is severely worn, so that the damage to the protective film or a head crash which is a fatal wound would occur. Further, in the magnetic disk having BR5 of less than 0.5, the heights of the projections tend to become uneven, and when the flying amount is small in order to increase the recording density, the magnetic head is liable to be contacted with the projections of the magnetic disk, thereby adversely affecting the head flying characteristics.

If the surface has the load ratio BR5 of more than 10% (as indicated by B in FIG. 3), the area of contact with the magnetic head slider surface is large, and the head flying characteristics are good, and the damage to the projections of the disk surface by CSS is small. However, as the frequency of CSS increases, the head tangential force increases, so that there occurs an accident in which the support system (for example, a spring) supporting the magnetic head is damaged. Further, at the time of stop in CSS, the magnetic head and the disk surface adhere to each other, so that the disk may not be rotated when the disk unit is activated. From the above results, BR5 (which is obtained from the three-dimensional load curve representing the surface shape of the magnetic disk) satisfying the various characteristics of the magnetic disk is 0.5% to 10%.

On the other hand, with respect to the symmetric property Rsk representing the evaluation item of the surface shape of the magnetic disk, if Rsk is more than 2 (as indicated by C in FIG. 3) with the load ratio BR5 of 0.5% to 10%, the height of the projections is very high. The magnetic head flies over the projections, and therefore as the height of the projections becomes higher, the distance between the magnetic head and the magnetic medium at the time of writing and reading by the magnetic head becomes larger. This is inconsistant with the effort of decreasing the head flying gap in order to improve the recording density. Therefore, the height of the projections is limited.

If the surface shape has Rsk of less than 0.5 (as indicated by D in FIG. 3), the height of the projections is low, and the slider surface of the magnetic head is liable to be contacted not only with the projections but also with the bottoms thereof, and therefore there can not be achieved the intended purpose that the projections support the magnetic head during the sliding movement of the magnetic head.

As described above, it will be appreciated that in order to obtain the magnetic disk of good characteristics, it is necessary to satisfy both of the required load ratio BR5 (0.5% to 10%) and the required symmetric property Rsk (0.5 to 2.0).

EXAMPLE 2

In the above Example 1, although the surface on which the depressions and projections of the magnetic disk are formed is the Ni-P plated surface 11 of the substrate, the Ni-P plated substrate surface 11 may be in the form of a mirror surface, or may have very fine depressions and projections, in which case depressions and projections are formed on an intermediate surface 12, a magnetic film 13, or a protective film 14 formed on this substrate surface. In this Example, depressions and projections are formed on a carbon protective film 14 by way of example.

An intermediate film 12 of chromium having a thickness of 50 nm to 400 nm was formed by sputtering on a Ni-P plated substrate 10 (which was the same substrate as used in Example 1) finished into a mirror surface, and then a Co-Cr magnetic film (30 to 60 nm in thickness) and a carbon protective film (about 50 nm in thickness) were formed thereon.

According to the same procedure as used with the Ni-P plated substrate surface 11 in Example 1, a resist film pattern of polyimide or polytetrafluoro-ethylene was formed by lithography on this protective film, and using this as a mask, those portions except for the resist film were removed a depth of about 10 nm to about 40 nm by etching of a dry process such as an oxygen plasma asher, and then the resist film was washed away, thereby providing the protective film surface having a surface condition similar to that of the Ni-P plated substrate surface 11 shown in FIG. 1.

A fluorine lubricating film 15 (several nm to several tens of nm in thickness) was formed on this surface to form a magnetic disk having a surface similar to that obtained with the Ni-P plate substrate surface 11 of Example 1.

Although two examples of magnetic disks have thus been described, there are other examples in which the depressions and projections are formed on the intermediate film or the magnetic film, and in any case, similar effects as achieved in the above Examples can be obtained.

EXAMPLE 3

Figure 6:
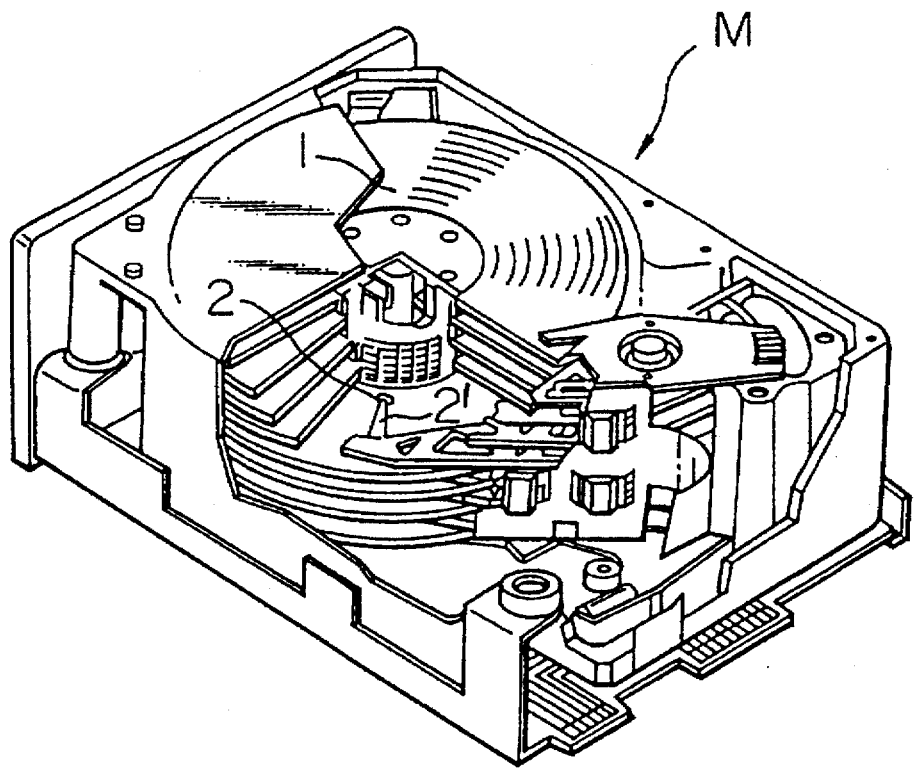
FIG. 6 is a partly-broken, perspective view showing a general construction of a magnetic disk unit.
Figure 7:
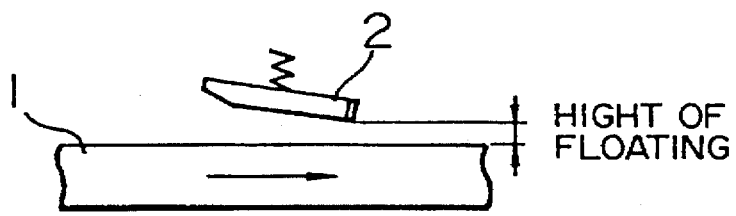
FIG. 7 is a view showing a flying state with respect to the magnetic disk and a magnetic head.
Figure 8:
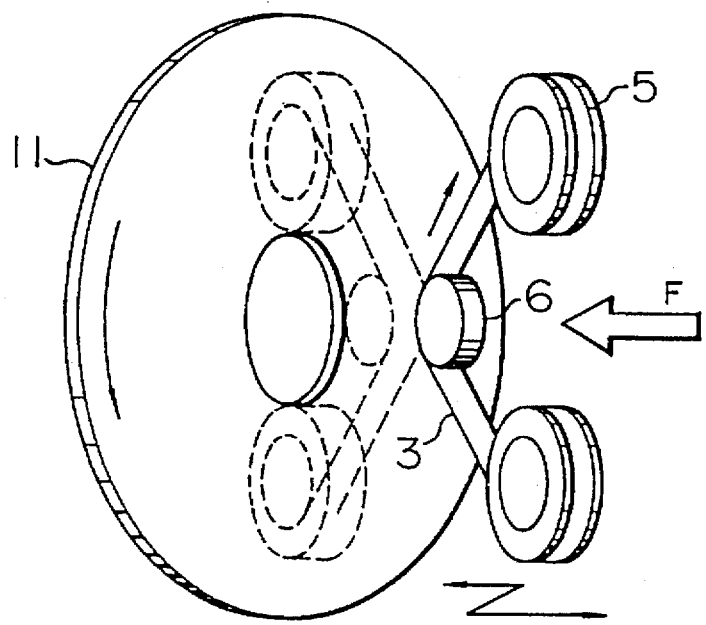
FIG. 8 is a schematic view showing a current texturing method.
Figure 9:
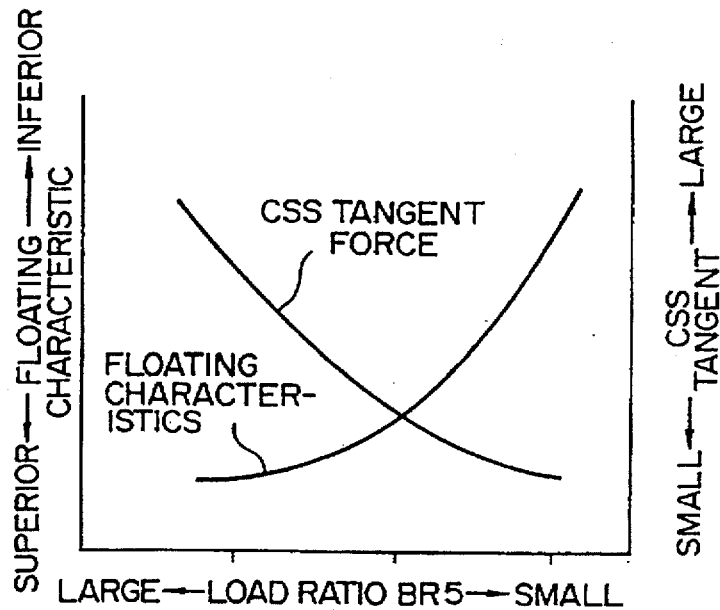
FIG. 9 is a characteristic diagram showing the relation between a disk surface nature and disk unit characteristics.
Figure 10:
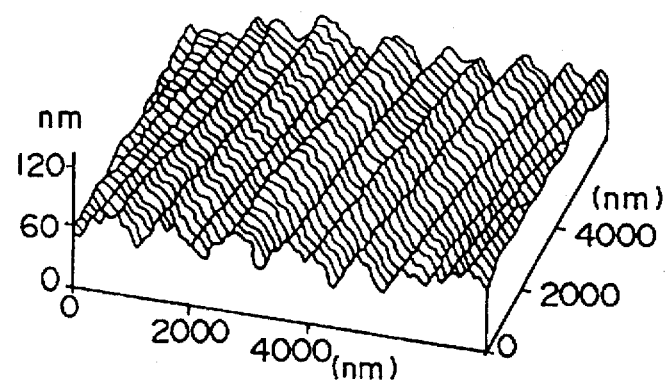
FIG. 10 is a view showing the shape of a textured surface formed by abrasive grains.

In this Example, the magnetic disk obtained in Example 1 were incorporated into a disk unit to provide a magnetic disk unit shown in FIG. 6.

The construction of the magnetic disk unit is well known. Namely, a plurality of magnetic disks 1 are mounted at predetermined intervals on a common rotation shaft. A head slider having a magnetic head thereon is resiliently contacted with the surface of each of the magnetic disks with a predetermined urging force when the disk is in a stationary condition and in an initial rotating condition. When the disk rotates, the head slider slides relative thereto, and is caused to fly or float by the high-speed rotation. This head 2 is reciprocally movable radially with respect to the disk 1 through a support mechanism 2', and includes a drive device for reading information by a CSS drive system.

As described in detail, according to the present invention, the intended objects can be achieved, and there can be obtained the magnetic disk having the surface which can sufficiently satisfy the flying characteristics of the magnetic disk and the sliding characteristics in CSS and head adhesion.

The fine depressions and projections of various shapes are formed on the surface of the magnetic disk, and this surface shape is controlled in such a manner that the load ratio BR5 is 0.5% to 10% and that the symmetric property Rsk is 0.5 to 2.0, and by doing so, the above magnetic disk can be easily produced.

Because of the use of magnetic disks excellent in the flying characteristics and sliding characteristics, there can be provided a magnetic disk unit which is extremely high in reliability.

What is claimed is:

1. A magnetic disk wherein when a surface shape of a contact surface of said magnetic disk for contact with a sliding surface of a magnetic head is evaluated and represented in terms of a load ratio BR5 of a three-dimensional load curve and a symmetric property Rsk of a cross-sectional shape, said load ratio of said surface shape is 0.5% to 10%, and said symmetric property Rsk of said surface shape is 0.5 to 2.0.

2. A magnetic disk unit comprises a plurality of magnetic disks as claimed in claim 1, said magnetic disks being mounted at predetermined intervals on a common rotation shaft, head sliders resiliently contacted respectively with at least one surface of said magnetic disks with a predetermined urging force when said disk is in a stationary condition and in an initial rotating condition, each of said head sliders having a magnetic head mounted thereon, each of said head sliders flying over its mating magnetic disk when said magnetic disk rotates at high speed, and there being provided a head drive device of a CSS drive system for driving each of said head sliders radially of said disk so as to read information.

3. A magnetic disk comprising a non-magnetic substrate, and a thin film formed on a surface of said substrate, said film including a magnetic film and a protective film; wherein when a surface shape of at least one of said substrate and said thin film is evaluated and represented in terms of a load ratio BR5 of a three-dimensional load curve and a symmetric property Rsk of a cross-sectional shape, said load ratio of said surface shape is 0.5% to 10%, and said symmetric property Rsk of said surface shape is 0.5 to 2.0.

4. A magnetic disk according to claim 3, in which said non-magnetic substrate comprises an aluminum alloy disk plated with Ni-P, wherein when a surface shape of said Ni-P plated surface is evaluated and represented in terms of a load ratio BR5 of a three-dimensional load curve and a symmetric property Rsk of a cross-sectional shape, said load ratio of said surface shape of said Ni-P plated surface is 0.5% to 10%, and said symmetric property Rsk of said surface shape of said Ni-P plated surface is 0.5 to 2.0.

5. A magnetic disk according to claim 3, in which said non-magnetic substrate is formed into a mirror surface, wherein when a surface shape of at least one of said magnetic film and said protective film constituting said thin film is evaluated and represented in terms of a load ratio BR5 of a three-dimensional load curve and a symmetric property Rsk of a cross-sectional shape, said load ratio of said surface shape of said one film is 0.5% to 10%, and said symmetric property Rsk of said surface shape of said one film is 0.5 to 2.0.

6. A magnetic disk according to claim 3, wherein said non-magnetic substrate is a glass substrate.

* * * * *